US008020091B2

(12) United States Patent
Burago et al.

(10) Patent No.: US 8,020,091 B2
(45) Date of Patent: Sep. 13, 2011

(54) ALIGNMENT AND BREAKING OF MATHEMATICAL EXPRESSIONS IN DOCUMENTS

(75) Inventors: Andrei Burago, Kirkland, WA (US); Sergey Genkin, Kirkland, WA (US); Victor Kozyrev, Issaquah, WA (US); Jennifer Michelstein, Kirkland, WA (US); Alexander Vaschillo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 11/182,628

(22) Filed: Jul. 15, 2005

(65) Prior Publication Data
US 2007/0016859 A1 Jan. 18, 2007

(51) Int. Cl.
*G06N 3/00* (2006.01)
(52) U.S. Cl. .......................... 715/243; 715/267
(58) Field of Classification Search .................. 715/234, 715/244, 245, 243, 267
See application file for complete search history.

(56) References Cited

U.S. PATENT DOCUMENTS

| | | |
|---|---|---|
| 3,946,365 A | 3/1976 | Bantner |
| 3,976,990 A | 8/1976 | Haak |
| 5,067,102 A | 11/1991 | Eisenstein |
| 5,189,633 A | 2/1993 | Bonadio |
| 5,251,292 A | 10/1993 | Martel, Jr. et al. |
| 5,321,773 A | 6/1994 | Kopec et al. |
| 5,432,721 A | 7/1995 | Satoh |
| 5,432,890 A | 7/1995 | Watanabe |
| 5,469,538 A | 11/1995 | Razdow |
| 5,609,427 A | 3/1997 | Takasawa et al. |
| 5,627,914 A | 5/1997 | Pagallo |
| 5,682,158 A | 10/1997 | Edberg et al. |
| 5,784,071 A | 7/1998 | Tang et al. |
| 5,793,381 A | 8/1998 | Edberg et al. |
| 5,802,532 A | 9/1998 | Nakayama et al. |
| 5,803,629 A | 9/1998 | Neville et al. |
| 5,825,999 A | 10/1998 | Uzaki et al. |
| 5,844,555 A | 12/1998 | Menaker et al. |
| 5,901,074 A | 5/1999 | Nakano et al. |
| 6,204,782 B1 | 3/2001 | Gonzalez et al. |
| 6,426,751 B1 | 7/2002 | Patel et al. |
| 6,549,923 B1 | 4/2003 | Sudoh |
| 6,610,106 B1 | 8/2003 | Jenks |
| 6,687,404 B1 | 2/2004 | Hull et al. |

(Continued)

FOREIGN PATENT DOCUMENTS
JP 11-259456 9/1999
(Continued)

OTHER PUBLICATIONS

American Mathematical Society, "AMS Latex Version 1.2 User's Guide," Jan. 1995, pp. ii-43.*

(Continued)

*Primary Examiner* — Kyle Stork
(74) *Attorney, Agent, or Firm* — Merchant & Gould, P.C.

(57) ABSTRACT

Embodiments relate to systems and methods for formatting a set of expressions in a document. In embodiments, the systems and methods provide the ability to format a set of expressions by aligning expressions or parts of expressions to each other or to the margins of the document, while also supporting breaking of one or more expressions into multiple parts to be placed on different lines. Breaking can include breaking in places requested by a user or breaking in places that are automatically determined to fit the expressions between the margins of a document.

19 Claims, 10 Drawing Sheets

U.S. PATENT DOCUMENTS

| | | |
|---|---|---|
| 6,795,838 B1 | 9/2004 | Kataoka |
| 6,829,620 B2 | 12/2004 | Hsing et al. |
| 6,925,597 B2 | 8/2005 | Anwar |
| 6,934,910 B2 | 8/2005 | Lange |
| 6,999,082 B2 | 4/2006 | Nishimura |
| 7,120,867 B2 | 10/2006 | Breuer et al. |
| 7,181,068 B2 | 2/2007 | Suzuki et al. |
| 7,188,115 B2 | 3/2007 | Farn et al. |
| 7,324,931 B1 | 1/2008 | Warlock |
| 2001/0007109 A1 | 7/2001 | Lange |
| 2003/0056181 A1 | 3/2003 | Marathe |
| 2004/0015342 A1 | 1/2004 | Garst |
| 2004/0027390 A1* | 2/2004 | Yamato et al. ............... 345/806 |
| 2004/0114258 A1 | 6/2004 | Harris, III et al. |
| 2004/0117731 A1 | 6/2004 | Blyashov |
| 2004/0157203 A1 | 8/2004 | Dunk et al. |
| 2004/0205583 A1 | 10/2004 | Jones et al. |
| 2004/0210818 A1 | 10/2004 | Jones et al. |
| 2004/0215647 A1 | 10/2004 | Farn et al. |
| 2005/0034068 A1* | 2/2005 | Jaeger ........................ 715/517 |
| 2005/0041017 A1 | 2/2005 | de Brebisson |
| 2006/0001667 A1 | 1/2006 | LaViola et al. |
| 2006/0005115 A1 | 1/2006 | Ritter et al. |
| 2006/0059214 A1 | 3/2006 | Sargent, III et al. |
| 2006/0059217 A1 | 3/2006 | Sargent, III et al. |
| 2006/0190474 A1 | 3/2006 | Michelstein et al. |
| 2006/0190821 A1 | 8/2006 | Michelstein et al. |
| 2006/0256116 A1 | 11/2006 | Burago et al. |
| 2006/0274070 A1 | 12/2006 | Herman et al. |
| 2007/0011515 A1 | 1/2007 | Heydarian et al. |
| 2007/0033524 A1 | 2/2007 | Michelstein et al. |
| 2008/0077854 A1 | 3/2008 | Alabi |

FOREIGN PATENT DOCUMENTS

| | | |
|---|---|---|
| JP | 2000293517 | 10/2000 |
| WO | WO/2006124139 | 11/2006 |
| WO | WO/2007011518 | 1/2007 |

OTHER PUBLICATIONS

"A Guide to LaTeX," Jun. 19, 1994, <http://www.astro.rug.nl/~kuijken/latex.html>, pp. 1-21.*

"The Winning Formula," Desktop Publishing Today, Technology, Nov. 1988, pp. 26 and 28.

Simon, Barry. "MathType5 Delivers Web Magic," Desktop Engineering, Apr. 2002, pp. 1-2.

"MathType Complete Feature List," as retrieved on Mar. 8, 2005 from http://www.mathtype.com/en/products/mathtype/features.htm.

Anthony et al., "Evaluation of Multimodal Input for Entering Mathematical Equations on the Computer," 2005, ACM, pp. 1184-1187.

Beeton et al., "Unicode Support for Mathematics,"http://www.unicode.org/reports/tr25/index.html. Copyright 2001-2003, pp. 1-45. (retrieved on Jun. 27, 2005).

Bruhn et al., "Displaying Mathematics In A Web Browser Using MathML and SVG," Mid-South College Computing Conference, 2004, pp. 97-106.

Connolly, "HTML 3.0 Draft (Expired!) Materials," Dec. 21, 1995, 1 page.

U.S. Appl. No. 11/067,378, filed Feb. 22, 2005, and entitled: Programmable Object Model for Mathematical Expressions, pp. 1-19 and 3 drawing sheets.

U.S. Appl. No. 11/067,540, filed Feb. 22, 2005, and entitled: Extensible Markup Language Schema for Mathematical Expressions, pp. 1-33 and 2 drawing sheets.

U.S. Appl. No. 11/129,149, filed May 13, 2005, and entitled: Method and System of Character Placement in Opentype fonts, pp. 1-19 and 10 drawing sheets.

"Character Encoding," (2002) http://gedcom-parse.sourceforge.net/doc/encoding.html, pp. 1-4, (retrieved on Feb. 12, 2008).

DuCharme, B., Math and XSLT—from XML.com, pp. 1-6 (Jul. 5, 2001).

"FreeType Glyph Conventions," Version 2.1, I. Basic typographic concepts, by David Turner; http://freetypesourceforge.net/freetype2/docs/glyphs/glyphs-l.html, 2 pgs. (retrieved on Mar. 13, 2005).

"FreeType Glyph Conventions," Version 2.1, III. Glyph Metrics, by David Turner; http://freetypesourceforge.net/freetype2/docs/glyphs/glyphs-3.html, 6 pgs. (retrieved on Mar. 13, 2005).

"FreeType Glyph Conventions," Version 2.1, IV. Kerning, by David Turner; http://freetypesourceforge.net/freetype2/docs/glyphs/glyphs-4.html, 3 pgs. (retrieved on Jul. 19, 2005).

"FreeType Glyph Conventions," Version 2.1, V. Text processing, by David Turner; http://freetypesourceforge.net/freetype2/docs/glyphs/glyphs-5.html, 5 pgs. (retrieved on Aug. 13, 2005).

"FreeType Glyph Conventions," Version 2.1, VII. FreeType bitmaps, by David Turner; http://freetypesourceforge.net/freetype2/docs/glyphs/glyphs-7.html, 5 pgs. (retrieved on Mar. 13, 2005).

Gear, C., "Numerical solution of ordinary differential equations at a remote terminal," ACM, pp. 43-49 (1966).

"Internationalized Text Manipulation Covering Perso-Arabic Enhanced for Mongolian Scripts," by Kataoka, T.I.; Kataoka, Y.; Uezono, K.; Ohara, H.; Electronic Publishing, Artistic Imaging, and Digital Typography, 7th Int'l Conference on Electronic Publishing, EP'98, held jointly with the 4th Int'l Conference on Raster Imaging and Digital Typography, RIDT'98 Proceedings, p. 305-18.

"Mathematics on the Web," *MacKichan Software, Inc.*, 19 pages (Dec. 2001).

"MathType Mathematical Equation Editor User Manual," 144 pages (Copyright 1987-2001).

Mathematical Markup Language (MathML) Version 2.0 (Second Edition); W3C Recommendation Oct. 21, 2003, Copyright© 1998-2003 W3C® (MIT, ERCIM, Keio), pp. 1-541.

Microsoft, "Word 2000 Screenshots," pp. 1-6 (Dec. 31, 1999).

"Natural Mathematical Notation," http://www.scientificword.com/nmn.html, *MacKichan Software, Inc.*, 2 pages (Copyright 1998) (retrieved on Sep. 24, 2004).

Oetiker, T. et al., "The Not So Short Introduction to Latex 2ϵ," Version 4.14, 145 pages (Copyright 1995-2002).

"Part Five Working With Fonts," Topics in IRIX Programming, http://ondine.cict.fr:8010/ebt-bin/nph-dweb/dynaweb/SGI_Developer/T_IRIX_Prog/@Gen...; pp. 1-16. (retrieved on Mar. 12, 2005).

Patent Office of the State Intellectual Property Office of the People's Republic of China, First Office Action, Application No. 200510088518.6, mailed Jan. 23, 2009, 11 pages.

Patent Office of the State Intellectual Property Office of the People's Republic of China, Second Office Action, Application No. 200510088518.6, mailed Jul. 3, 2009, 11 pages.

Phillips, "Special Edition Using XML," Published Aug. 25, 2000; Chapter 24 Section 2, (pp. 1-16), Chapter 24 Section 10 (pp. 1-8), Copyright Page for proof of priority date (pp. 1-2).

"PS Technical Word Processor," *Scroll Systems, Inc.*, Front page, Copyright page, Contents (iii-xii), Chapter 13 (13-1-13-20) (Copyright 1985, 1986, 1987).

Sargent III, M. "Unicode, Rich Text, and Mathematics," *Microsoft Corporation*, 19 pages (Aug. 30, 1995).

Sargent III, M., "Unicode Nearly Plain-Text Encoding of Mathematics," *Microsoft Corporation*, 16 pages (Jul. 2, 2004).

ScienceWord Manual, mk:@MSITStore:C: \temp \Temporary%20Directory%201%20for%20SW31Manual.zip\S..., Chapter One, Chapter Four (Sections 1-3, 5-10), 27 pages (Date last printed Sep. 29, 2004).

Smithies et al., "A Handwriting-Based Equation Editor," Jun. 1999, 8 pages.

"Statistical-Based Approach to Word Segmentation," by Yalin Wang; Phillips, I.T.; Haralick, R.; Proceedings 15th Int'l Conference on Pattern Recognition, ICPR-2000, Part Vo. 4, p. 555-8 vol. 4.

"TeX," http://en.wikipedia.org/wikiTeX; 7 pgs. (retrieved on Mar. 12, 2005).

"The Anatomy of a Large-Scale Hypertextual Web Search Engine," by Sergey Brin and Lawrence Page; http://net.pku.edu.cn/~webg/html/com1921.htm, 9. 1-20. (retrieved on Mar. 3, 2005).

"Typeface," http://en.wikipedia.org/wiki/Typeface, p. 1-8, (retrieved on Jul. 19, 2005).

U.S. Final Office Action cited in U.S. Appl. No. 10/943,095 mailed Sep. 17, 2008.

U.S. Final Office Action cited in U.S. Appl. No. 11/067,378 mailed Feb. 4, 2009.

U.S. Final Office Action cited in U.S. Appl. No. 11/067,378 mailed Nov. 16, 2007.
U.S. Final Office Action cited in U.S. Appl. No. 11/067,540 mailed Feb. 23, 2009.
U.S. Final Office Action cited in U.S. Appl. No. 11/067,540 mailed Nov. 14, 2007.
U.S. Final Office Action cited in U.S. Appl. No. 11/196,801 mailed Apr. 1, 2009.
U.S. Final Office Action cited in U.S. Appl. No. 11/229,023 mailed Sep. 11, 2008.
U.S. Office Action cited in U.S. Appl. No. 10/943,095 mailed Feb. 21, 2008.
U.S. Office Action cited in U.S. Appl. No. 10/943,095 mailed May 7, 2009.
U.S. Office Action cited in U.S. Appl. No. 11/067,378 mailed Apr. 30, 2007.
U.S. Office Action cited in U.S. Appl. No. 11/067,378 mailed May 14, 2008.
U.S. Office Action cited in U.S. Appl. No. 11/067,540 mailed Aug. 6, 2008.
U.S. Office Action cited in U.S. Appl. No. 11/067,540 mailed May 1, 2007.
U.S. Office Action cited in U.S. Appl. No. 11/196,801 mailed Sep. 18, 2008.
U.S. Office Action cited in U.S. Appl. No. 11/229,023 mailed Feb. 20, 2008.
U.S. Office Action cited in U.S. Appl. No. 11/229,023 mailed Jan. 11, 2010.
U.S. Office Action cited in U.S. Appl. No. 11/229,023 mailed May 12, 2009.
U.S. Official Action in U.S. Appl. No. 11/196,801 mailed Apr. 1, 2009.
U.S. Appl. No. 10/943,095 to Sargent III et al., entitled "Systems and Methods for Automated Equation Buildup" and filed on Sep. 15, 2004.
Unicode, Inc., "C0 Controls and Basic Latin," Copyright 1991-2005, pp. 420-425.
Unicode, Inc., "Mathematical Alphanumeric Symbols," Copyright 1991-2005, pp. 969-995.
"Word Level Script Identification for Scanned Document Images," by Huanfeng Ma; David Doermann; Document Recognition and Retrieval XI, San Jose CA, Jan. 21-22, 2004; SPIE Proceedings Series, 2004, 5296, p. 124-35.
W3, "HTML Math," Published 1995, 4 pages (retrieved on Feb. 10, 2009). http://www.w3.org/MarkUp/htm13/maths.html.
Zhao et al. "Math Information Retrieval: User Requirements and Prototype Implementation," ACM, 2008.
*Baird in Ulster WP Breakthrough*, PrintWorld, vol. 208, No. 34, Aug. 25, 1982, p. 5. (No Document).
*Best info for European Markets*, Typeworld, vol. 12, No. 18, Sep. 2, 1988, p. 8. (No Document).
Chinese First Office Action, Application No. 200510088518.6, mailed Jan. 23, 2009, 11 pages.
Chinese Second Office Action, Application No. 200510088518.6, mailed Jul. 3, 2009, 11 pages.
Chung, C.Y., et al. *Typesetting Forms and Mathematical Equations in Chinese Information Processing*, IEEE, Conference: IEEE 1985 Proceedings of the International Conference on Cybernetics and Society, # 08250, pp. 46-50.
Drakos, Nikos. *From Text to Hypertext: A Post-hoc Rationalization of LaTeX2HTML*, Computer Networks and ISDN Systems, 27, Nov. 1994, pp. 215-224.
*Electronic Composing System Hitcap 600 from Hitachi Manufacturing Ltd.*, Apr. 7, 1990, Jpn Print. News, No. 3522, p. 7. (No Document).
*Equal Writes*, MacUser No. 32, Feb. 1989, pp. 84-85.
Etzel, Deborah. *TK Solver Plus, Mathematical Equation Solver*, Intelligent Instruments & Computers, Nov. 1987, vol. 5, No. 11, pp. 278-80.
Gardner, John A, et al. *New Methods of Reading, Writing, and Manipulating Information by People with Print Impairments*, Osterreichische Computer Gesellschaft, Wien, Austria, 1996, vol. 2, pp. 792.

Graham, Richard. *EXACT, Companion Product for a Word Processing System*, Intelligent Instruments & Computers, Sep.-Oct. 1988, vol. 6, No. 9-10, p. 261-4.
Griffin, D.M., *Multimedia Presentations in Civil Engineering Courses Using Mathcad*, 1996 ASEE Annual Conference Proceedings, 0412W2, 20 pages.
Harrison, Michael, et al. *Numbering Document Components*, Mar. 1991, UK, Journal: Electronic Publishing: Origination, Dissemination and Design, vol. 4, No. 1, p. 43-60.
*Illuminating Manuscript (Technical Word Processor)*, What Micro, Apr. 1987, pp. 48-50. (No Document).
InfoLogic, Inc., "MathMagic Personal Edition & MathMagic Pro Edition User Guide," Dec. 2003, 100 pages.
Ion et al., "Mathematical Markup Language (MathML) Frequently Asked Questions (FAQ)," Copyright 1998, 7 pages.
*Japanisch, Ein Software-Tool zur numberischen Simulation: Visual DEQSOL (Differential Equation Solver Language), Interactive Numerical Simulation System; VisualD DEQSOL*, 1992, Transactions of Information Processing Society of Japan, v33, n7, pp. 929-943.
Jones, "Using the Equation Editor," Aug. 10, 2003, 9 pages.
Koch, H. William, et al. *Computerization of Research Journals: Significance to Numeric Data Users*, Pergamon, Conference: Proceedings of the Sixth International CODATA Conference (1978), pp. 127-132.
Lanzendorfer, Max J. *Selling Expertise in Word Processing-to-Typesetting*, Print. Impress, vol. 24, No. 8, Jan. 1982, pp. 10F-10L.
LyX Team, "The LyX User's Guide," Jun. 2006, pp. 1-105.
LyX, "News," retrieved from Internet Mar. 11, 2008, 39 pages, p. 13 includes "New Maintenance Release: LyX 1.3.4 Released" dated Feb. 19, 2004.
Ma, Kai Kaung, et al. *Fundamental error analysis and geometric interpretation for block truncation coding techniques*, Elsevier, Aug. 2000, Signal Processing: Image Communication, vol. 15, No. 10, p. 859-67.
*Mathematics Editor Offers Extra Intelligence*, IOP Publishing, Scientific Computing World, Jun.-Jul. 1999, No. 47, p. 43.
*Mathtype 2.0*, Jul. 1, 1989, Typeword, vol. 13, No. 13, p. 10. (No Document).
*Optical Character Recognition (and Document Conversion)*, Aslip, London, 1991, Conference: Translating and the Computer 12. Applying Technology to the Translation Process, pp. 45-7, 45-92.
Phillips, "Special Edition Using XML," Aug. 25, 2000, Copyright page (pp. 1-2), Chapter 24 Section 2, (pp. 4-9), Chapter 24 Section 10 (pp. 35-41).
Plandowski, Wojciech. *Satisfiabillity of Word Equations With Constants is in PSPACE*, 2004, Journal of the ACM v 51 n 3, pp. 483-496.
Rayner, Timothy J., et al., *Review: T/sup 3/-αPC Scientific Word Processing System*, Laboratory Microcomputer, 1989, vol. 8, No. 3, pp. 99-102.
Romano, Frank. *From Print Shop to Desktop—and Back Again*, Can. Printer Publ., vol. 97, No. 4, Apr. 1989, pp. 10-11, 14.
Rytter, Wojciech. *Compressed and Fully Compressed Pattern Matching in One and Two Dimensions*, Proceedings of the IEEE, 2000, 88 (11) pp. 1769-1778.
*Text Live Math for It's Professional Publishing System*, Typeword, vol. 10, no. 15, Nov. 1986, p. 15. (No Document).
*The NBI System 3000—A Powerful Document Handler*, Seybold Rep, vol. 2., No. 5, Jun. 1979, pp. 1-15.
Written Opinion of the International Searching Authority dated Mar. 5, 2008, and International Search Report for PCT/US06/12644, 13 pages.
Furuta, Richard. *An Integrated, but not Exact-Representation, Editor/Formatter*, Cambridge, 1986, Conference: Text Processing and Document Manipulation, pp. 246-259.
Illuminating Manuscript (Technical Word Processor) What Micro, Apr. 1987, pp. 48-50.
LyX Team, "The LyX User's Guide," Jun. 1, 2006, pp. i-vii, 1-97.
Chinese Fourth Office Action, Application No. 200510088518,6., mailed Jul. 13, 2010, 8 pages.
Chinese Grant of Patent Right for Invention, Application No. 200510088518.6., mailed Sep. 15, 2010, 4 pages.

U.S. Final Office Action cited in U.S. Appl. No. 11/229,023 mailed Jun. 8, 2010, 17 pages.
Weideman et al., "A MATLAB Differentiation Matrix Suite," ACM, 2000, pp. 465-519.
Response to Final Office Action mailed Jun. 8, 2010, as cited in U.S. Appl. No. 11/229,023, filed Sep. 7, 2010, [8 pp].
Response to Non-Final Office Action mailed May 12, 2009, as cited in U.S. Appl. No. 11/229,023, filed Aug. 12, 2009, [8 pp].
Response to Non-Final Office Action mailed Jan. 11, 2010, as cited in U.S. Appl. No. 11/229,023, filed Apr. 12, 2010, [8 pp].
Response to Final Office Action mailed Sep. 11, 2008 and Advisory Action mailed Dec. 31, 2008, as cited in U.S. Appl. No. 11/229,023, filed Mar. 11, 2009, [8 pp].
Response to Final Office Action mailed Sep. 11, 2008, as cited in U.S. Appl. No. 11/229,023, filed Dec. 11, 2008, [9 pp].
Advisory Action cited in U.S. Appl. No. 11/229,023, mailed Dec. 31, 2008, [3 pp].
Response to Non-Final Office Action mailed Feb. 20, 2008, as cited in U.S. Appl. No. 11/229,023, filed May 20, 2008, [8 pp].
Response to Non-Final Office Action mailed Aug. 6, 2008, as cited in U.S. Appl. No. 11/067,540, filed Nov. 6, 2008, [6 pp].
Response to Final Office Action mailed Nov. 14, 2007, as cited in U.S. Appl. No. 11/067,540, filed May 14, 2008, [6 pp].
Response to Non-Final Office Action mailed May 1, 2007, as cited in U.S. Appl. No. 11/067,540, filed Aug. 31, 2007, [7 pp].
Response to Non-Final Office Action mailed May 14, 2008, as cited in U.S. Appl. No. 11/067,378, filed Nov. 14, 2008, [10 pp].
Response to Final Office Action mailed Nov. 16, 2007, as cited in U.S. Appl. No. 11/067,378, filed Apr. 16, 2008, [8 pp].
Response to Non-Final Office Action mailed Apr. 30, 2007, as cited in U.S. Appl. No. 11/067,378, filed Aug. 29, 2007, [9 pp].
1 Response to Non-Final Office Action mailed May 7, 2009, as cited in U.S. Appl. No. 10/943,095, filed Aug. 6, 2009, [11 pp].
Response to Final Office Action mailed Sep. 17, 2008 and Advisory Action mailed Jan. 2, 2009, as cited in U.S. Appl. No. 10/943,095, filed Mar. 17, 2009, [13 pp].
Response to Final Office Action mailed Sep. 17, 2008, as cited in U.S. Appl. No. 10/943,095, filed Dec. 17, 2008, [10 pp].
Response to Non-Final Office Action mailed Feb. 21, 2008, as cited in U.S. Appl. No. 10/943,095, filed May 20, 2008, [9 pp].
Advisory Action cited in U.S. Appl. No. 10/943,095, mailed Jan. 2, 2009, [3 pp].
Notice of Allowance and Fee(s) Due mailed Jan. 8, 2010, as cited in U.S. Appl. No. 10/943,095, [15 pp].
Response to Non-Final Office Action mailed Sep. 18, 2008, as cited in U.S. Appl. No. 11/196,801, filed Dec. 18, 2008, [9 pp].

Amirat, Youcef Ait, et al. *Towards an Algebraic System Theory Toolbox*, Pergamon, UK, Federation of Automatic Control, vol. F, Nonlinear Systems II, 1996, [p. 299-304].
Lee, Kyo Boem, et al. *A Design and Implementation of Application S/W Based on a Quality Evaluation of S/W*, Inst. Electr. Eng. Japan Publishing, Transactions of the Institute of Electrical Engineers of Japan, Part C, vol. 122-C, No. 12, 2002, [pp. 2180-2188].
Arsdell, Van J.N. et al. "Cloning, Characterization, and Expression in Saccharomyces Cerevisiae of Endoglucanase I from Trichoderma Reesei" Bio/Technology, Mature Publishing Co. New York, US, vol. 5, No. Jan. 1987, pp. 60-64.
Brueil C. et al. "Production and Localization of Cellulases and Beta Glucosidase from the Thermphilic Fungus Thielavia Therrestris Biotechnology Letters," vol. 8, No. 9, 1986, pp. 673-676.
Gilbert M. et al. "Characterization of the Enzymes Present in the Cellulase System of Thielvian Terrestris 255B" Bioresource Technology, Elsevier, GB, vol. 39, No. 2, 1992, pp. 147-153.
Gilkes N.R. et al. "Domains in Microbial Beta-1, 4-Glycanases: Sequence Conservation, Function, and Enzyme Families" Microbiological Reviews, and American Society for Microbiology, Washington, DC, US, vol. 55, No. 2, Jun. 1, 1991, pp. 303-315.
Henrissatt B. "A Classification of Glycosyl Hydrolases Based on Amino Acide Sequence Similarities" Biochemical Journal, Portland Press, London, GB, vol. 280, 1991, pp. 309-316.
International Search Report, published on Nov. 23, 2006, PCT/US2006/012644 (WO 2006/124139A3), 4pp.
Kleywegt G.J. et al. "The Crystal Structure of the Catalytic Core Domain of Endoglucanase I from Trichoderma Reesei at 3.6 A Resolution, and a Comparison with Related Enzymes," Journal of Molecular Biology, London, GB, vol. 272, No. 3, 26 Sep. 1997, pp. 383-397.
Kvesitadze E.G. et al. "Isolation and Properties of a Thermostable Endoglucanase from a Thermophilic Mutant Strain of Thielavia Therrestris," Applied Biochemistry and Biotechnology, Clifton, NJ, US, vol. 50, No. 2, 1995, pp. 137-143.
Response to Final Office Action mailed Dec. 6, 2010, as cited in U.S. Appl. No. 11/229,023, filed Feb. 21, 2011, 10 pp.
Trevor Murphy, "Multiple Solutions for Digitizing Equations for Students," ACM, 2005, pp. 244-246.
U.S. Final Office Action cited in U.S. Appl. No. 11/229,023 mailed Dec. 6, 2010, 18 pp.
Written Opinion of the International Searching Authority dated Jul. 9, 2008, and International Search Report for PCT/US06/25684, 49 pp.
Korean Patent Application No. 10-2005-56757, Notice of Preliminary Rejection mailed Jun. 28, 2011, 3 pages, no English translation.

* cited by examiner

ALIGNMENT AND BREAKING OF MATHEMATICAL EXPRESSIONS IN DOCUMENTS

BACKGROUND

When an author generates a document that includes a series of mathematical expressions, the author often wants the expressions to be formatted in a certain way to enhance the readability and to make the workflow from one expression to the next obvious. For example, an author often will want a series of expressions to be aligned at the equal sign to clearly delimit what has changed on either the right or left hand side of the expressions. Generally, expression editing tools associated with word processing and presentation software programs align the expressions as a whole, e.g., left align, right align, or center the expressions. For example, the expression editing tools generally align the first character of the expression with the left margin of the page, regardless of any character or element within the expression. To format the set of expression in other ways, the users of these expression editing tools generally must endure a tedious, manual, editing process to separately format each expression. Further, the editing process is often frustrated or complicated when the viewing space, such as on a web browser, changes width. Such a change in width invariably results in undesired formatting. It is with respect to these and other considerations that the present invention has been made.

SUMMARY

The above and other problems are solved by systems and methods for formatting mathematical expressions that allow an author to accomplish some manual formatting and maintain that formatting through some automatic formatting. In embodiments, a set of mathematical expressions is generated. One or more of the expressions is formatted, such as by inserting a manual break in the expression. A manual break is a user-inserted format, such as a carriage return, that separates one portion of an expression from another portion of the expression. In embodiments, the set of two or more expressions are also formatted. In one embodiment, the set of expressions are aligned according to two or more alignment points. An alignment point is an element within the expression used to align the expression with a related element in another expression. The set of expressions, in embodiments, are also formatted with respect to the document. In one embodiment, the set of expressions are formatted to fit within the width of the document. As such, one or more "automatic breaks" are inserted in the expressions to ensure the whole expression is presented with the document.

The exemplary embodiments may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present exemplary embodiments and their improvements can be obtained by reference to the accompanying drawings, which are briefly summarized below, and to the following detailed description of exemplary embodiments, and to the appended claims.

DETAILED DESCRIPTION

The present exemplary embodiments will now be described more fully hereinafter with reference to the accompanying drawings. The methods and systems may, however, assume many different forms and should not be construed as limited to the exemplary embodiments set forth herein; rather, these embodiments are provided so that this disclosure will be thorough and complete for those skilled in the art.

The present exemplary embodiments relate to new and improved methods and systems for formatting mathematical expressions in a document. In embodiments, the formatting comprises alignment in conjunction with breaking. For instance, a plurality of expressions is first aligned. During alignment, each expression is allowed to have limitless horizontal space such that the margins are ignored and the expression may cross the margins in the document. An anchor point is determined for all expressions, and an alignment point is determined for each expression. Each expression is aligned such that the alignment point in the expression has the same horizontal position as the anchor point. Then, the expressions are no longer considered to have limitless horizontal space, and it is determined if one or more expressions crosses a margin. If an expression crosses a margin, a break is inserted into the expression to locate a portion of the expression on a new line in the document. In this manner, a plurality of mathematical expressions can be automatically formatted in a document to be both aligned within the document and adjusted to the width of the document.

Figure 1:
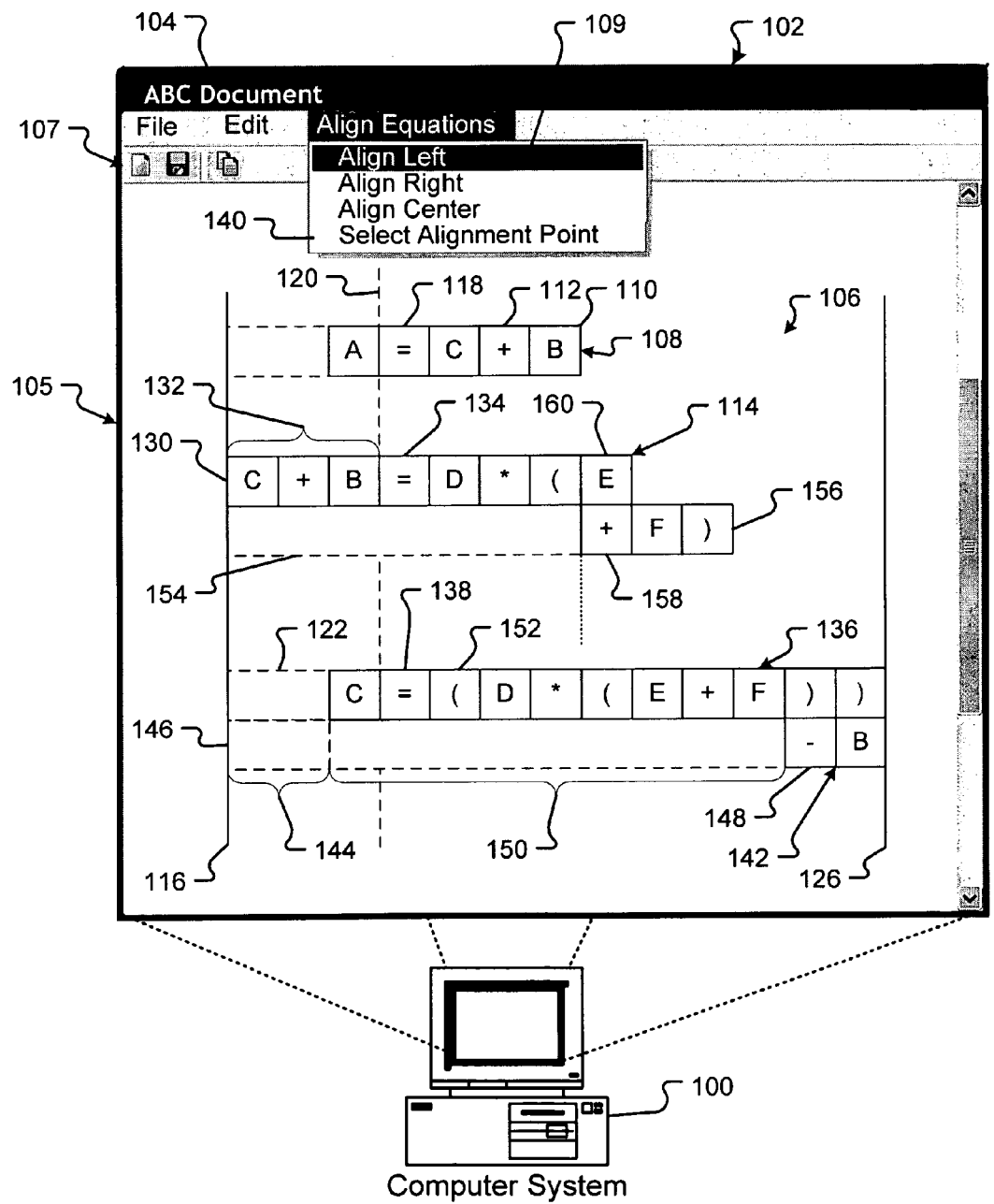
FIG. 1 is an embodiment of a document application with an expression editing tool illustrating formatting of a plurality of expressions according to the present disclosure.

A document is any representation of information. In exemplary embodiments, the document is a text document, a graphic diagram, such as a flow chart, an organizational chart, a pie chart, etc., a spreadsheet, a web page, or other type of document. A computer system 100 that may be used to execute an expression editing tool in accordance with the present disclosure is shown in FIG. 1. As used herein, a "computer system" shall be construed broadly and is defined as one or more devices or machines that execute programs for displaying and manipulating text, graphics, symbols, audio, video, and/or numbers.

The computer system 100 displays information, such as display screen 102. The display screen 102 is enlarged to show details of the display. The display 102 relates to an over-simplified display of an example document application with the capability of generating, formatting, aligning, breaking, and displaying mathematical expressions. In embodiments, "mathematical expressions" or "expressions" are any idea or concept that can be expressed mathematically, such as equations, mathematical formula, chemical formula, DNA sequences, etc. Importantly, although display 102 displays a set of mathematical equations, many other types of expressions comprising various elements may be generated, formatted, aligned, broke, and displayed in accordance with the present disclosure, and thus, the examples illustrating equations shown in the Figures and explained herein are not meant as limitations, but merely as illustrations.

In the particular example shown in FIG. 1, the display 102 has a title bar 104 and a document window 105. There may be other windows for managing other information. Document window 105 displays a document 106 with a set of expressions, such as expressions 108, 114, and 136. Document window 105 provides user controls and other input mechanisms, such as control buttons 107 and menu 109, among potentially many others. Such user interface controls are generally known in the art and are useful in managing certain types of information.

A document 106, in embodiments, has margins, such as first margin 116, e.g., the left margin, and second margin 126, e.g., the right margin. In embodiments, margins are generally the boundaries of the document that define the width of the document, and the material presented in the document is presented between the margins. Documents are arranged as a series of lines from the top of the document to the bottom of the document. The lines contain the presented material. The material in each line of the document has a certain horizontal position between the left margin 116 and the right margin 126. A horizontal position is the position between a first margin 116 and a second margin 126 that can be calculated in points, inches, or other measure. The amount of material that can be presented in any line is determined by the width of the document, which is the amount of area between the first margin 116 and the second margin 126.

An expression, such as expression 108, is formed from a set of elements, such as elements 112 and 110. An element is any number, variable, operator, abbreviation, format, such as a space, or other part of an expression. In embodiments, each element is enclosed within a "bounding box," as shown in FIG. 1. This bounding box or "bbox" is the imaginary, bounding, two-dimensional box within which the displayable element will fit. The bboxes may have different dimensions from one another, but, in the exemplary embodiment in FIG. 1, the bboxes are displayed as having similar sizes. However, the bboxes shown in FIG. 1 are not meant to limit the possible embodiments but are provided merely as an illustration. As one skilled in the art will recognize, the bboxes may be used to both identify and determine horizontal positions for alignment points or used to determine other measurements, described hereinafter.

In embodiments, one or more expressions, such as expression 114, may have a break inserted into the expression. In one embodiment, a user provides input identifying where the expression should be broken. This user provided input is referred to as a "manual break." Thus, the expression is broken into two or more separate portions that are displayed on separate lines of the document, such as portion 130 and portion 156. Breaking an expression is the process of separating a first portion of the expression from a second portion of the expression. Upon providing the manual break, the user can identify how to "align" the second portion 156 of the expression with the first portion 130 of the expression on the first line. For example, the user may determine that element 158 of the second portion 156 should be aligned with element 160 of the first portion 130. The two portions 130 and 156 can maintain this spatial relationship. As such, embodiments provide systems and methods to determine an indention, such as indention 154, to align the broken part of the expression in the appropriate position. In embodiments, the indention for the broken portion is constructed from one or more portions.

In further embodiments, the set of expressions can be aligned. In embodiments, an anchor point is identified. An anchor point is a location to which an expression will be aligned. Then, an element within each expression is identified as an alignment point. An alignment point is a portion of each expression selected by the user that will have the same horizontal position in the document as the anchor point when the expressions are aligned. In the exemplary embodiment shown in FIG. 1, the anchor point is element 118 and the alignment points are elements 134 and 138. Therefore, every expression 108, 114, and 136 in the exemplary set of expressions will be aligned such that the equals sign in the expressions has the same horizontal position, as is represented by dashed line 120.

In one embodiment, one expression, such as expression 114 is identified. The identified expression 114 is aligned in the document such that the first element 130 of the expression 114 is positioned to abut the first margin 116. A distance 132 is then determined from the first margin 116 to an anchor point 134. Then, a position correction, such as indention 122, is calculated for each expression, such as expression 136, to ensure that the alignment point, such as alignment point 138, in each expression has the same horizontal position 120 as the anchor point 134 in the identified expression 114. The expression-specific indentions are applied to each expression, and the aligned expressions, as shown in document 106, are presented. During the alignment process, each expression is allowed to have limitless horizontal space. In other words, the expressions can cross over the second margin 126 without affecting the formatting of the expression.

After alignment, another type of break occurs when there is limited space between the margins and a portion of an expression, such as portion 142, crosses a margin, such as margin 126. This type of break is referred to as an "automatic break." To determine where to insert an automatic break in the expression, a portion of the expression, such as portion 148, is identified that can be separated from the rest of the expression. The broken portion is set on the new line. In embodiments, the broken portion is then formatted according to some default positioning, such as left alignment, right alignment, as shown in FIG. 1, or center alignment. In further embodiments, the user may specify an alignment, such as adding an indent. This user-specified indent can be incorporated with the calculated indents.

Figure 2:
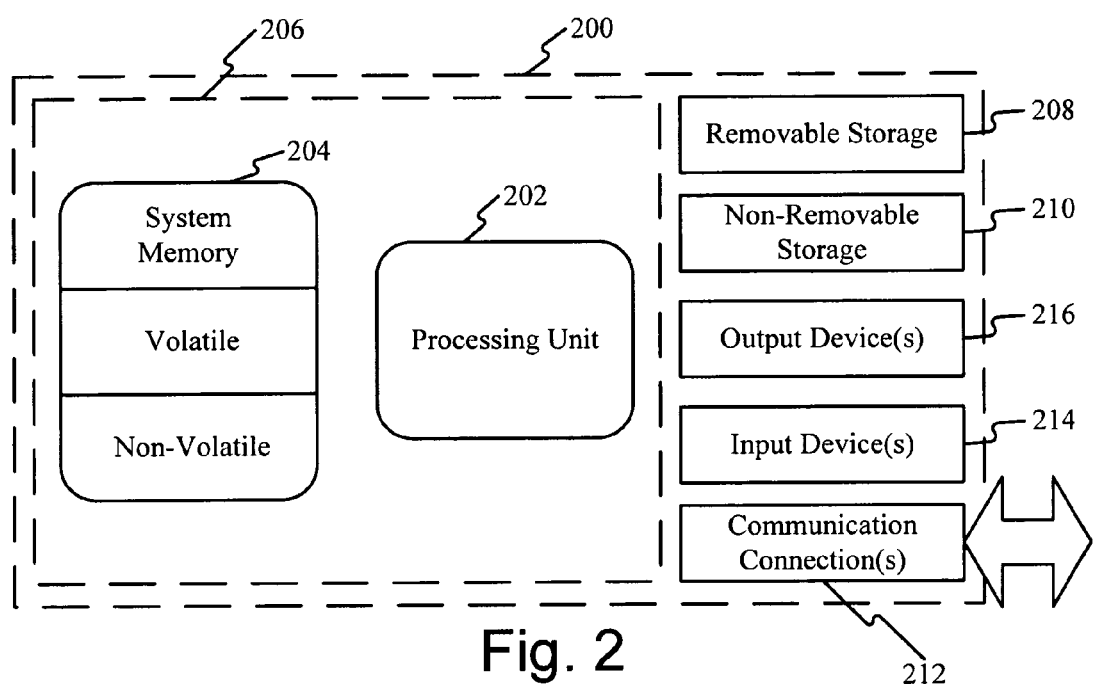
FIG. 2 is a functional diagram illustrating a computing environment and a basic computing device that can operate the expression editing tool according to the present disclosure.

An example of a suitable operating environment in which the embodiments may be implemented is illustrated in FIG. 2. The operating environment is only one example of a suitable operating environment and is not intended to suggest any limitation as to the scope of use or functionality. Other well known computing systems, environments, and/or configurations that may be suitable for use with the embodiments, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the embodiments includes a computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.), or some combination of the two. The most basic configuration of the computing device 200 is illustrated in FIG. 2 by dashed line 206.

Additionally, device 200 may also have additional features or functionality. For example, device 200 may also comprise additional storage (removable and/or non-removable) including, but not limited to, magnetic disks, optical disks, or tape. Such additional storage is illustrated in FIG. 2 by removable storage 208 and non-removable storage 210. Computer storage media includes volatile and nonvolatile, removable and non-removable media implemented in any method or technology for storage of information, such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. The devices 214 may help form the user interface 102 discussed above while devices 216 may display results 106 discussed above. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of the any of the above should also be included within the scope of computer readable media. In embodiments, the software for executing the expression editing tool and aligning and breaking expressions is stored on the computer readable media or in memory 204 and/or executed by the processing unit 202.

The computer device 200 may operate in a networked environment using logical connections to one or more remote computers (not shown). The remote computer may be a personal computer, a server computer system, a router, a network PC, a peer device, or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computer device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application programs may reside on memory device connected to the remote computer system. It will be appreciated that the network connections explained are exemplary and other means of establishing a communications link between the computers may be used.

Figure 3:
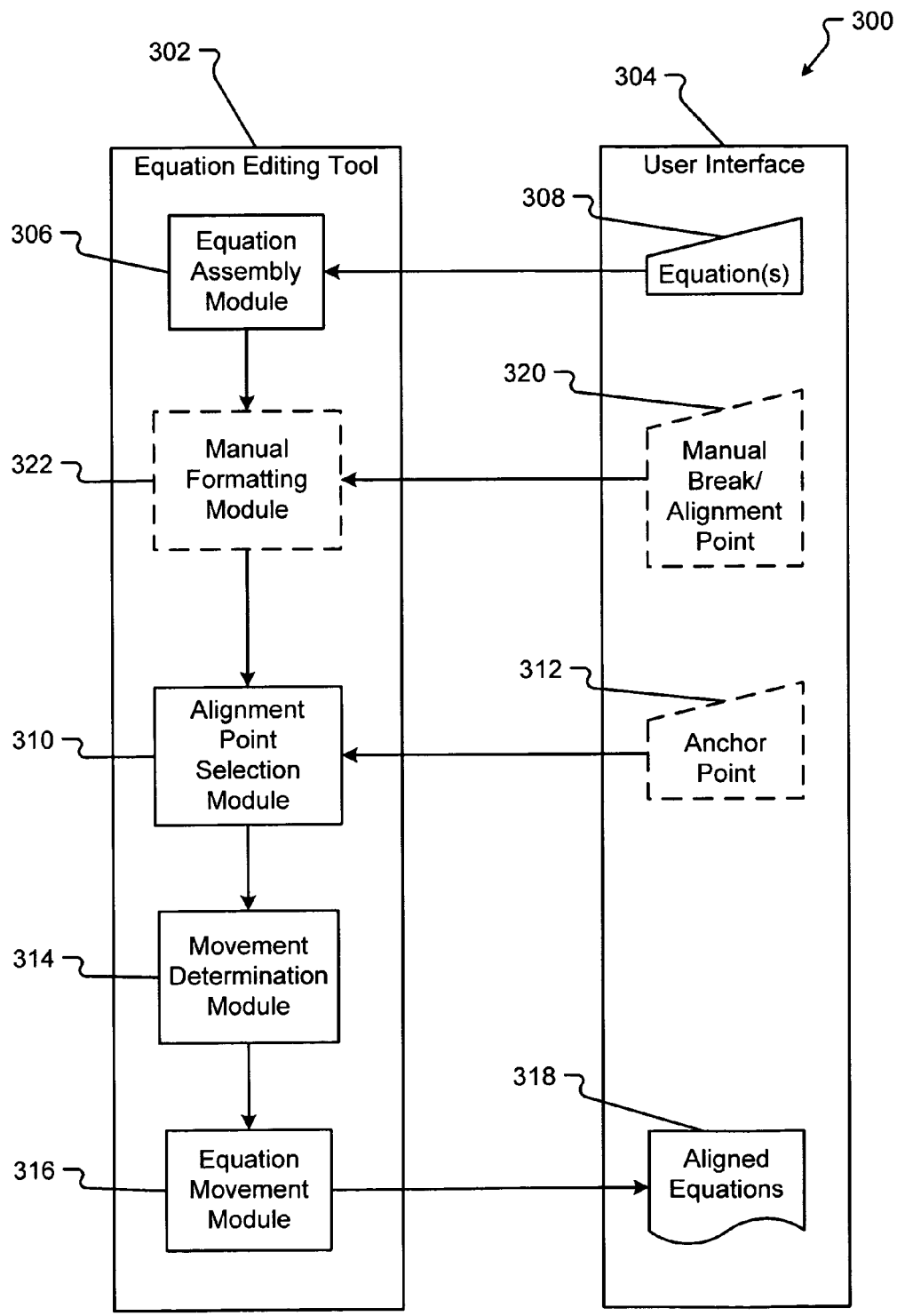
FIG. 3 is an embodiment of an expression editing tool and a related user interface for creating and formatting expressions in a document according to the present disclosure.

An exemplary document application 300 having an expression editing tool 302 and a user interface 304 is shown in FIG. 3. The document application 300, in embodiments, comprises one or more software modules. In one embodiment, the expression editing tool 302 comprises an expression assembly module 306, a manual formatting module 322, an alignment point selection module 310, a movement determination module 314, and an expression movement module 316. The user interface 304 is operable to display information to a user and receive inputs from the user. In embodiments, the user interface 304 receives inputs for the expressions 308, a manual break, and/or alignment point 320, the selection of an alignment point 312, and displays the aligned expressions 318.

In embodiments, the expression assembly module 306 receives expression input 308 from the user interface 304. The expression input 308 comprises a series of elements for a set of expressions. As the elements are input, by, for example, a mouse or keyboard, the expression assembly module 306 assembles the expressions, element by element, into finished expressions. In one embodiment, the expressions each comprise a completed mathematical formula or mathematical statement that occupies at least one separate line in the document. In other words, a shorter expression is displayed on one line of the document and no other expression is displayed with the expression on that single line of the document. If the expression is longer, the expression may occupy two or more lines, but regardless, no other expression is displayed with the longer expression on any line for which that longer expression occupies. The expression assembly module 306 assembles each expression in the plurality or the set of expressions in similar fashion until the user stops providing expression input 308. The set of expressions is provided to the manual formatting module 322.

The manual formatting module 322 receives manual break insertions for one or more expressions. A manual break is a user input that identifies how to separate the expression between two elements. For example, the user places a carriage return between two elements in the expression. Each expression may have one or more manual breaks. The user identifies one or more elements within an expression to insert the one or more manual breaks. The user continues through each expression until possibly every expression in the set of expressions has a manual break. After inserting the manual break, the user, in embodiments, also provides an alignment point for the broken part of the expression. In other words, a second portion of the expression, which is positioned on a second line of the document, has an element that is aligned with an element in a first portion of the expression. If the expression has more than one manual break, the user may align an element in a third portion with an element in a first portion, a second portion, or both a first portion and second portion of the expression. Thus, each broken expression can be aligned in a certain manner. In one embodiment, the user provides no manual breaks as is represented by the dotted line forming the manual formatting module 322 and the manual break input 320. The manual formatted expressions are provided to the alignment point selection module 310.

The alignment point selection module 310 identifies anchor points for the plurality of expressions. In one embodiment, the user selects the anchor point 312 with the user interface 304, and provides the anchor point selection to the alignment point selection module 310. For example, the user highlights an equals sign and then selects a user interface control, such as menu item 140 (FIG. 1), to input the equals sign as the anchor point. In another embodiment, the alignment point selection module 310 automatically selects the anchor point. For example, the alignment point selection module 310 scans and compares each expression in the set of expressions to find one or more elements that are common to all expressions. If one element is common to all expressions, the alignment point selection module 310 identifies that element as the anchor point. However, if two or more elements are common to all expressions, the alignment point selection module 310 may identify the first common element presented in the first expression of the set of expressions. Further, the alignment point selection module 310 also identifies the alignment point for each expression. In embodiments, the common element is identified as the alignment point. One skilled in the art will recognize other methods and systems for identifying the anchor point and the alignment that are included within the scope of the present embodiments. The alignment point selection module 310 provides the expressions, the identified anchor points, and the alignment points to the movement determination module 314.

The movement determination module 314 determines the direction and distance of any horizontal movement for one or more expressions to effectuate the alignment of all expressions. In other words, the movement determination module 314 determines a required indention for each expression to provide that the alignment point of each expression as the same horizontal position as the anchor point. In embodiments, the movement determination module 314 allows each expression to have limitless horizontal space and cross either margin. Then, the movement determination module 314 aligns the first expression at the top of the set of expressions with a first margin, e.g., the left margin. The position of the anchor point in the first expression is then determined. The movement determination module 314 then calculates, for each subsequent expression, the direction and distance of indention or movement to align the alignment point of that expression with the position of the anchor point of the first expression. In another embodiment, the direction and distance of movement for each expression is determined based on the alignment point of the expression immediately above it. Thus, the calculation of the amount of movement for each expression is necessarily related to the first expression by a cascading series of alignment steps. In other embodiments, if the alignment of the expressions and the associated manual formatting will generate an unreadable or illogical expression, any manual formatting is cancelled. The direction and distance determination for each expression and the expressions are then provided to the expression movement module 316.

In further embodiments, after alignment, the movement determination module 314 no longer allows each expression to have limitless horizontal space and determines if one or more expressions or portions of an expression is too long to be displayed in the width of the document. The movement determination module 314, in embodiments, automatically identifies and applies one or more breaks. For example, the movement determination module 314 searches the expression, near the second margin, for a certain type of element, such as a space, an operator, or other type of element. Upon finding the certain type of element, the movement determination module 314 inserts the break in front of the element. In embodiments, the movement determination module 314 then determines on which side of the anchor point, in the first expression, the broken portion of the expression belongs. An indent is calculated such that the broken part of the expression remains on the appropriate side of the anchor point. In another embodiment, the broken portion of the expression is aligned according to some default formatting, e.g., left align or right align. The breaks and indentions for the broken portions are sent to the expression movement module 316.

The expression movement module 316 moves each expression according to the direction and distance calculated for each expression. Upon moving one or more expressions, the aligned expressions 318 are provided and presented to the user in the user interface 304.

Figure 4A:
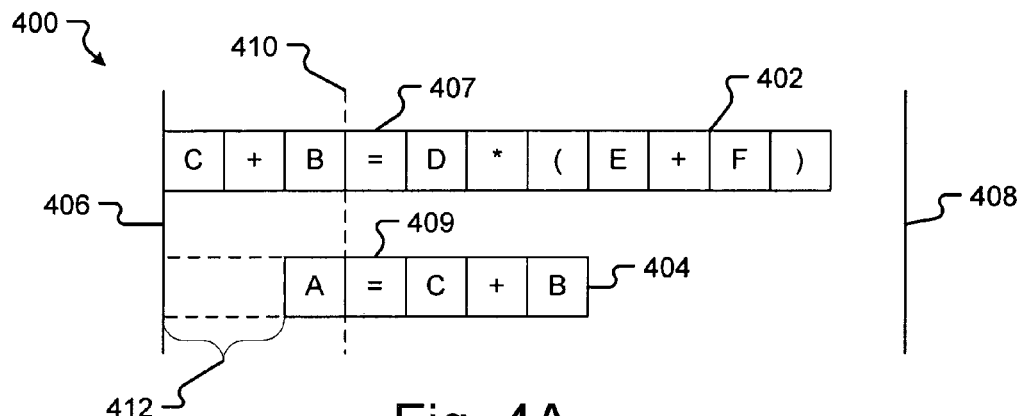
FIG. 4A, FIG. 4B, and FIG. 4C are embodiments of a user interface illustrating how an expression editing tool formats expressions within a document according to the present disclosure.
Figure 4B:
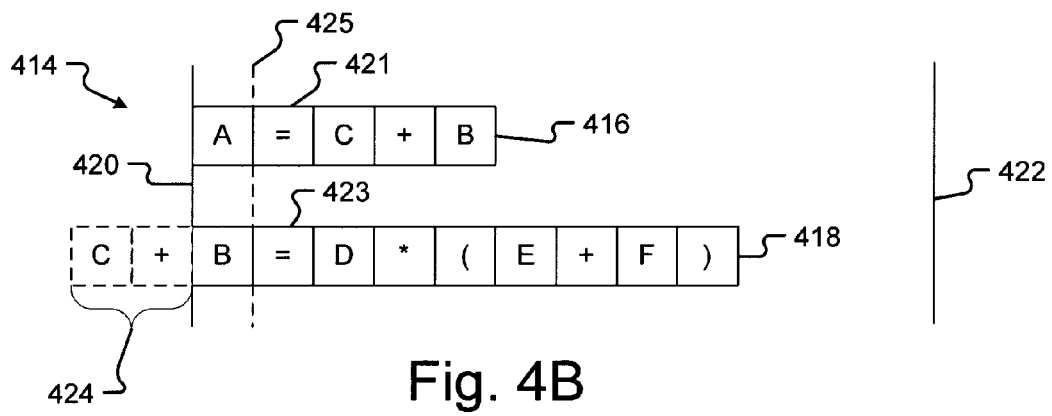
Figure 4C:
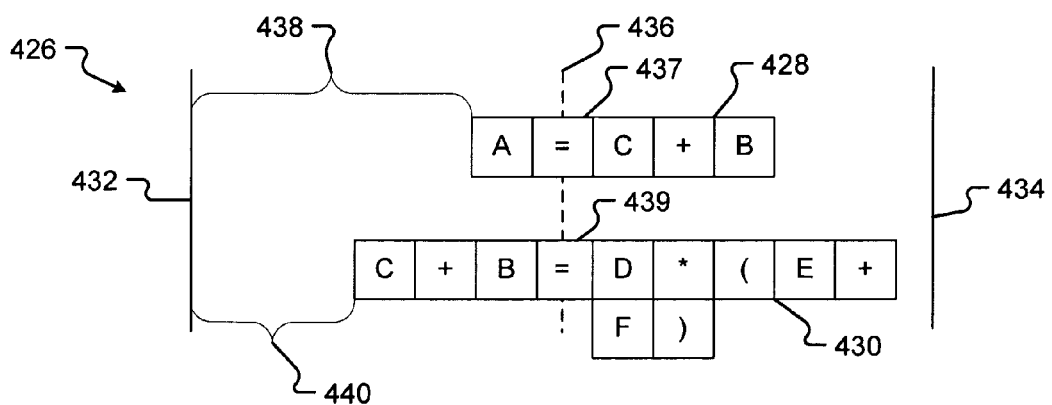

To further illustrate how the expressions are formatted, some exemplary user interfaces showing different types of alignment are shown in FIG. 4A, FIG. 4B, and FIG. 4C. A first exemplary embodiment of an alignment 400 is shown in FIG. 4A. Here, two expressions 402 and 404 are being aligned. The first expression 402 is first moved to abut with a first margin 406. The anchor point 407 is the equals sign. The position 410 of the equals sign is determined for the first expression 402. Then, a determination of the direction and distance for a movement or indention is determined that will align the alignment point 409 in the second expression 404 with the position 410. The indention required is determined to be for a distance 412. Since the direction of the movement is to the right of the first margin 406, the direction of movement is "positive." As such, the required movement for the second expression 404 is a "positive indention" equal to the distance 412. Upon moving the second expression 404 the positive indention, both expressions 402 and 404 are aligned.

A second exemplary embodiment of an alignment 414 is shown in FIG. 4B. In the embodiment in FIG. 4B, the alignment is not completed to further enhance the description provided hereinafter. A first expression 416 and a second expression 418 are being aligned. Again, the first expression 416 is first moved to abut with a first margin 420. The anchor point 421 and the alignment point 423 is the equals sign. The position 425 of the equals sign is determined for the first expression 416. Then, a determination of the direction and distance for a movement or indention is determined that will align the alignment point 423 of the second expression 418 with the position 425. The movement is determined to be for a distance 424. Since the required direction of the movement is from the left of the first margin 420 as represented by the dashed bboxes, the direction of movement is considered "negative." As such, the required movement for the second expression 418 is a "negative indention" equal to the distance 424. However, if only the second expression 418 is moved the negative indention, the alignment points 421 and 423 will not align. As such, both expressions 416 and 418 are moved an additional positive indention equal in length to the negative indention to maintain the alignment and ensure that the second expression 418 does not cross the first margin 420.

A third exemplary embodiment of an alignment 426 is shown in FIG. 4C. In the embodiment in FIG. 4C, the expressions 428 and 430 are being aligned in the center of the document between the first margin 432 and the second margin 434. As such, the position 436 of the anchor point is known because the position 436 is half way between the first margin 432 and the second margin 434. The distance and direction of a movement 438 for the first expression 428 is determined such that the alignment point 437 is centered over the position 436. The same determination of the distance and direction of a movement 440 for the second expression 430 is made such that the alignment point 439 is centered over the position 436. Then, both expressions 428 and 430 are moved to align the expressions at the center of the document. One skilled in the art will recognize other types of alignments, such as right aligning the expressions according to the second margin, e.g. the right margin, left aligning the expressions according to the first margin, e.g., the left margin, using the same techniques.

Figure 5A:
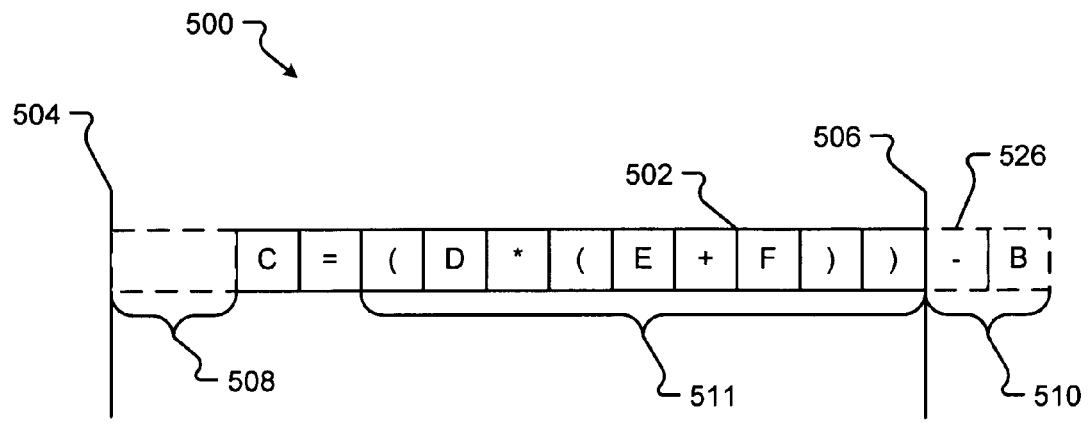
FIG. 5A and FIG. 5B are embodiments of a user interface illustrating how an expression editing tool creates formats in an expression according to the present disclosure.

In a further embodiment, a user interface illustrating the identification and application of an automatic break in an aligned expression is shown before the break and after the break in FIG. 5A and FIG. 5B, respectively. In embodiments, an automatic break is applied during a formatting process where, after the alignment, a portion of an expression crosses a margin, e.g., the right margin, and must be placed on the next line of the document. The expression 502 is shown in the user interface view 500 after an alignment. In this exemplary embodiment, expression 502 was assembled between a first margin 504 and a second margin 506. During alignment, the expression 502 was moved according to positive indention 508. The indention 508 caused a portion 510 of the expression 502 to cross the second margin 506. As such the portion 510 is in an area of the document that must be moved to ensure the portion 510 is both displayed and/or printed correctly in the width of the document. Thus, a break is necessary.

Figure 5B:
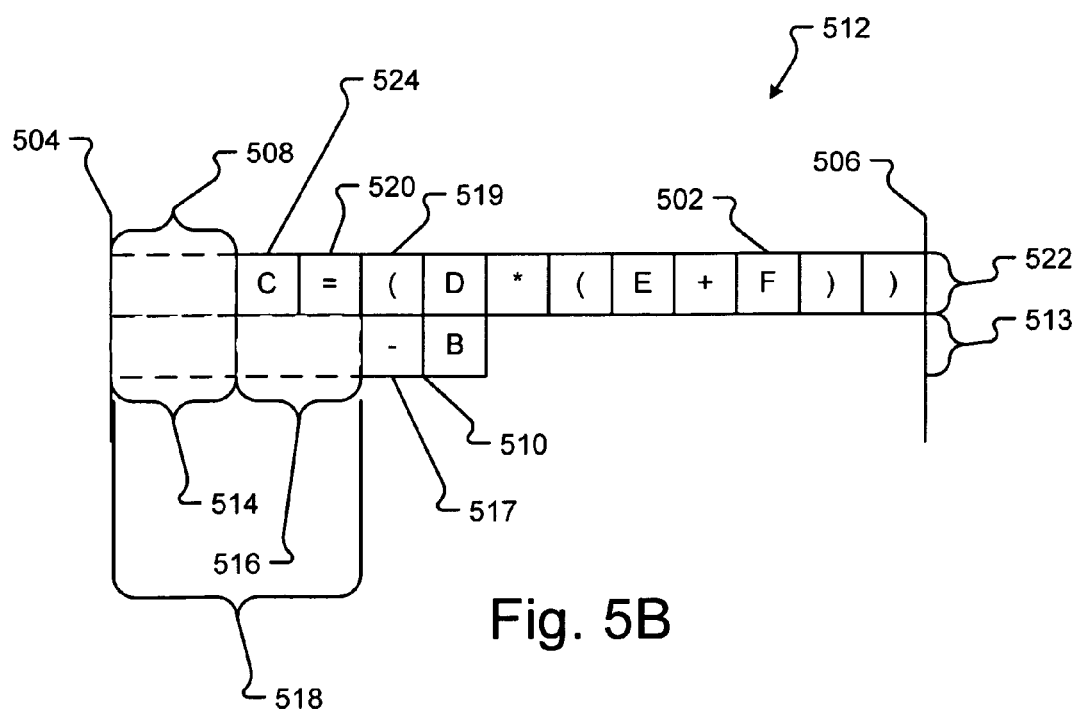

In the user interface view 512 of FIG. 5B, the expression 502 is again shown but after the break is completed. Here, the expression 502 maintains the alignment indention 508 and the expression's position between the first margin 504 and the second margin 506. However, the portion 510 of the expression that crossed the second margin 506 in the first view 500 is moved to a next line 513 of the document. In embodiments, a break point is identified. Certain portions in an expression are easier to move than other elements. For example, a portion of an expression that follows an operator, such as portion 510, may be easier to move than a portion of a parenthetical expression, such as portion 511 in FIG. 1A. As such, an element that can be used as a breaking point is identified. In the embodiment illustrated in FIG. 1A and FIG. 1B, the expression 502 has an operator 526 that can be used as the breaking point. In embodiments, a formatting instruction, such as a carriage return, is placed in front of the break point, and the portion after the formatting instruction is moved to a next line of the document.

In embodiments, to ensure the expression 502 maintains "meaning," i.e., the formatting of the expression does not alter or appear to alter the expression, an indention 518 is calculated for the portion 510. The indention 518, in embodiments, has two components. First, a break indention 516 is determined. The break indention 516 is a direction and distance calculation required to align the first element 517 of the portion 510 with the first element 519 presented after the alignment point 520, of the portion of the expression 502 on the first line 522. In other words, the break indention is the distance from the first edge of the first element 529 in the expression to the second edge of the alignment point 520. A second portion of the indention 518 is an alignment indention 514 that is equivalent to the alignment indention 508. The indentions 518 and 516 ensure the portion 510 maintains the proper position in the expression 502 to maintain the meaning of the expression. For instance, the portion 510 is not placed on the "wrong side" of the equals sign. In other embodiments, the portion 510 is aligned according to default formatting. For example, the portion 510 is aligned with the second margin 506.

Figure 10A:
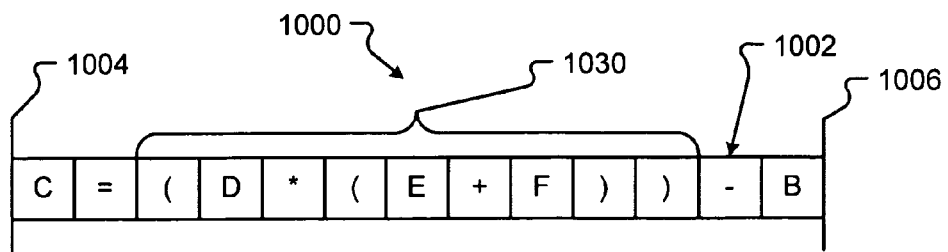
FIG. 10A, FIG. 10B, FIG. 10C, and FIG. 10D are embodiments of a user interface illustrating how an expression editing tool allows manual formatting and how the manual formatting is treated during alignment of an expression according to the present disclosure.
Figure 10B:
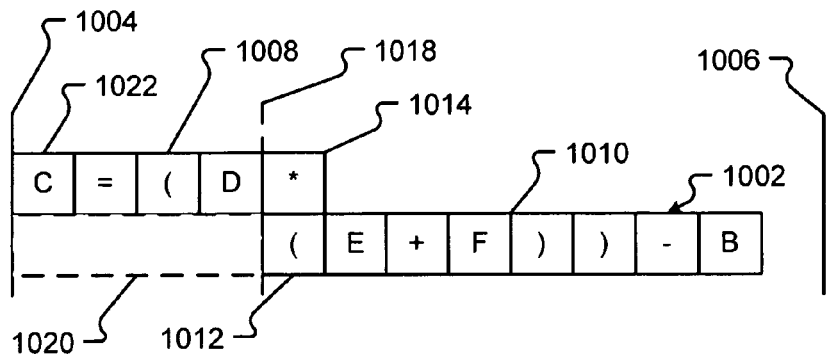
Figure 10C:
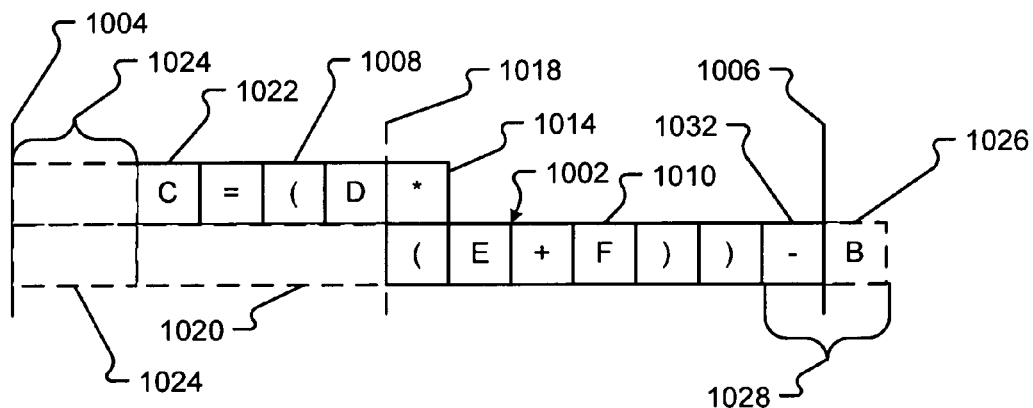
Figure 10D:
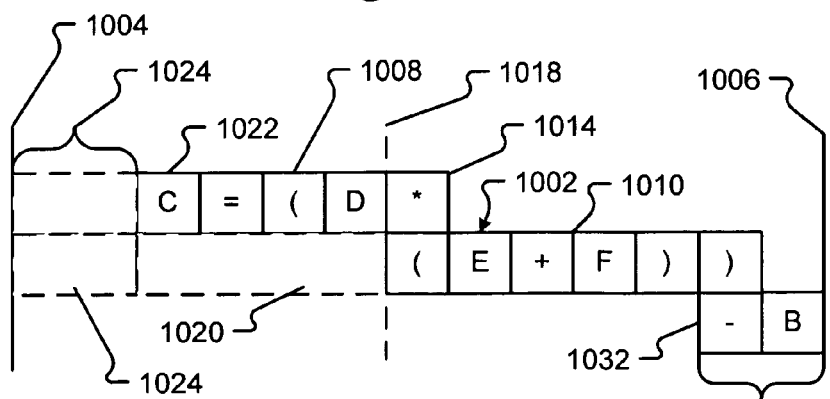

In a further embodiment, a user interface 1000 illustrating the application and maintenance of a manual break in an aligned expression is shown before the manual break in FIG. 10A, after the manual break FIG. 10B, after an alignment in FIG. 10C, and after an automatic break in FIG. 10D. The expression 1002 is shown in the user interface view 1000 before any manual formatting. In this exemplary embodiment, expression 1002 was assembled between a first margin 1004 and a second margin 1006.

In the user interface view of FIG. 10B, the expression 1002 is again shown but after the manual break is completed. Here, the expression 1002 has a first portion 1008 on a first line and a second portion 1010 on a second line. In addition to the manual break, the user also provided an alignment for the broken portion 1010. Here, element 1012 in the second or broken portion 1010 is aligned to element 1014 of the first portion 1008. Thus, the second portion 1010 is aligned to dashed line 1018. In embodiments, to effectuate the alignment, an indention, such as indention 1020, is calculated from the first element 1022 of the first portion 1008. It should be noted that each line of the expression is considered to have limitless length during the alignment.

The user interface view in FIG. 10C shows the same expression 1002 after an alignment with one or more other expressions (not shown). In the exemplary embodiment, an indention 1024 is applied to both the first portion 1008 and the second portion 1010 of the expression 1002. Even after the alignment, the second portion 1010 maintains its alignment 1018 with the first portion 1008 by adding indention 1020 to indention 1008. The indentions 1024 maintain the alignment of the expression 1002 with the other expressions (not shown) in the set of expressions and the position of the first portion 1008 and the second portion 1010 between the first margin 1004 and the second margin 1006. However, a portion 1026 of the expression 1002 crossed the second margin 1006 and must be moved to a next line of the document.

In embodiments, the lines are not considered to have limitless length after the alignment, and an automatic break point is identified. Certain portions in an expression are easier to move than other elements. For example, a portion of an expression that follows an operator, such as portion 1028, may be easier to move than a portion of a parenthetical expression, such as portion 1030 in FIG. 10A. As such, an element that can be used as an automatic breaking point is identified. In the embodiment illustrated in FIG. 10C, the expression 1002 has an operator 1032 that can be used as the automatic breaking point. In embodiments, a formatting instruction, such as a carriage return, is placed in front of the break point 1032, and the portion 1028 after the formatting instruction is moved to a next line of the document.

The expression 1002 is shown in another user interface view after applying the automatic break in FIG. 10D. In embodiments, to ensure the expression 1002 maintains "meaning," i.e., the formatting of the expression does not alter or appear to alter the expression 1002, an indention is calculated for the portion 1028. The indention, in embodiments, has two components. First, a break indention is determined. The break indention is a direction and distance calculation required to align the first element 1032 of the portion 1010 with the another element, such as element 1014 the portion of the expression 1008 on the first line. In other words, the break indention is the distance from the first edge of the first element 1022 in the expression 1002 to the first edge of the first element 1032. A second portion of the indention is an alignment indention that is equivalent to the alignment indention 1024. The indentions ensure the portion 1028 maintains the proper position in the expression 1002 to maintain the meaning of the expression. For instance, the portion 1010 is not placed on the "wrong side" of the equals sign. In other embodiments, the portion 1028 is aligned according to default formatting, as is shown in FIG. 10D. For example, the portion 1028 is aligned with the second margin 1006.

Figure 9:
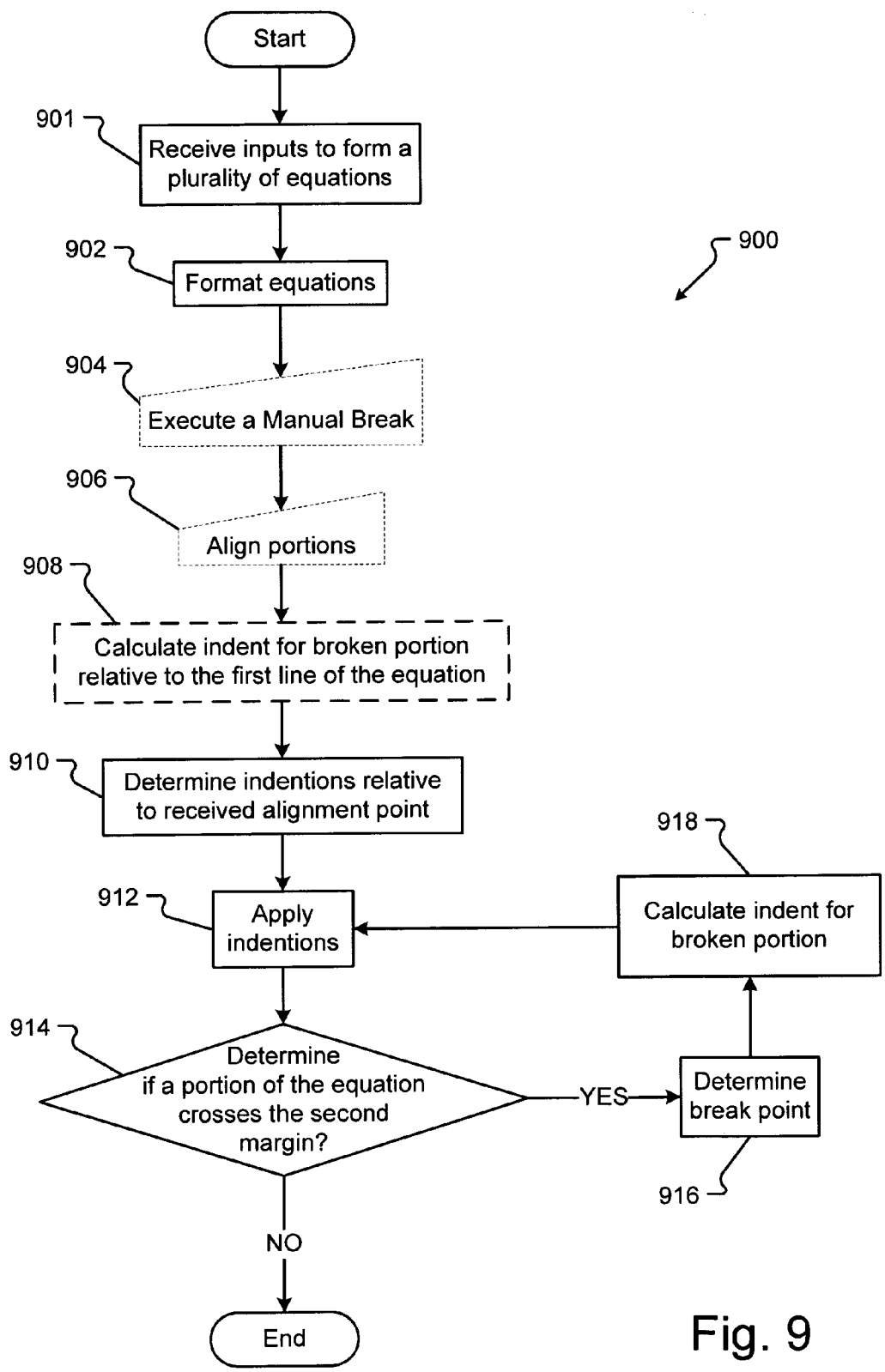
FIG. 9 shows an embodiment of a method for formatting expressions such that manual formatting is preserved while aligning expressions according to the present disclosure.

An exemplary method 900 for formatting expressions in a document is shown in FIG. 9. Receive operation 901 receives inputs to form a plurality of expressions. In one embodiment, a user provides expression inputs, such as input 308 (FIG. 3), from a user interface, such as user interface 304 (FIG. 3). The expression input may comprise two or more elements for each expression. The element inputs form a set of expressions wherein each expression exclusively occupies one or more lines of the document. Format operation 902 formats the expressions such that each expression has limitless length and occupies only one line in the document, regardless of the width of the document.

Optionally, execute operation 904 receives and executes at least one manual break. In embodiments, a user provides a manual break, such as manual break input 320 (FIG. 3), into a user interface. In one embodiment, the user enters a carriage return in front of an element of the expression. By entering the manual break, the portion of the expression after the manual break is positioned on the next line of the document. Optionally, in embodiments, align operation 906 receives an alignment point from the user, such as alignment point 320, and aligns an element of the broken portion of the expression with an element in the first portion of the expression, as is explained in conjunction with FIG. 10A and FIG. 10B. Optionally, if an element of the broken portion is aligned with an element of the first portion, calculate operation 908 calculates an indent for the broken portion relative to the first portion, as explained in conjunction with FIG. 10A, FIG. 10B, and FIG. 10C. In embodiments, each line of the expression is then considered to have limitless length.

Determine operation 910 receives an anchor point for the two or more expressions, an alignment point for each expression, and determines indentions relative to both the anchor point and the alignment points. In embodiments, a distance and direction of movement is determined to align the alignment point with the anchor point for each expression, as explained in conjunction with FIG. 4A, FIG. 4B, and FIG. 4C. The distance and direction of movement forms an indention. Apply operation 912 applies the determined indentions to the two or more expressions and provides aligned expressions.

Determine operation 914 determines if any portion of an expression crosses a margin, e.g., the right margin. If a portion of an expression crosses a margin, the flow branches YES to determine operation 916. If no portion of any expression crosses a margin, the flow branches NO to provide the aligned and formatted expressions. Determine operation 916 determines a break point for an automatic break. If no break point can be determined, i.e., the automatic break in conjunction with any manual formatting will make the expression unreadable, indiscernible, or confusing, the manual formatting may be cancelled. Once the break point is found, the broken portion of the expression is moved to a next line in the document. Calculate operation 918 calculates an indent for the broken portion. In one embodiment, an element of the broken portion is aligned with an element of the first portion of the expression. An indent relative to the first portion is calculated, as explained in conjunction with FIG. 4A, FIG. 4B, and FIG. 4C. In another embodiment, the broken portion is aligned and indented according to some default formatting. For example, the broken portion is right aligned with the right margin, as is explained in conjunction with FIG. 10D. The flow then continues to apply operation 912 to apply the indentions.

Figure 6:
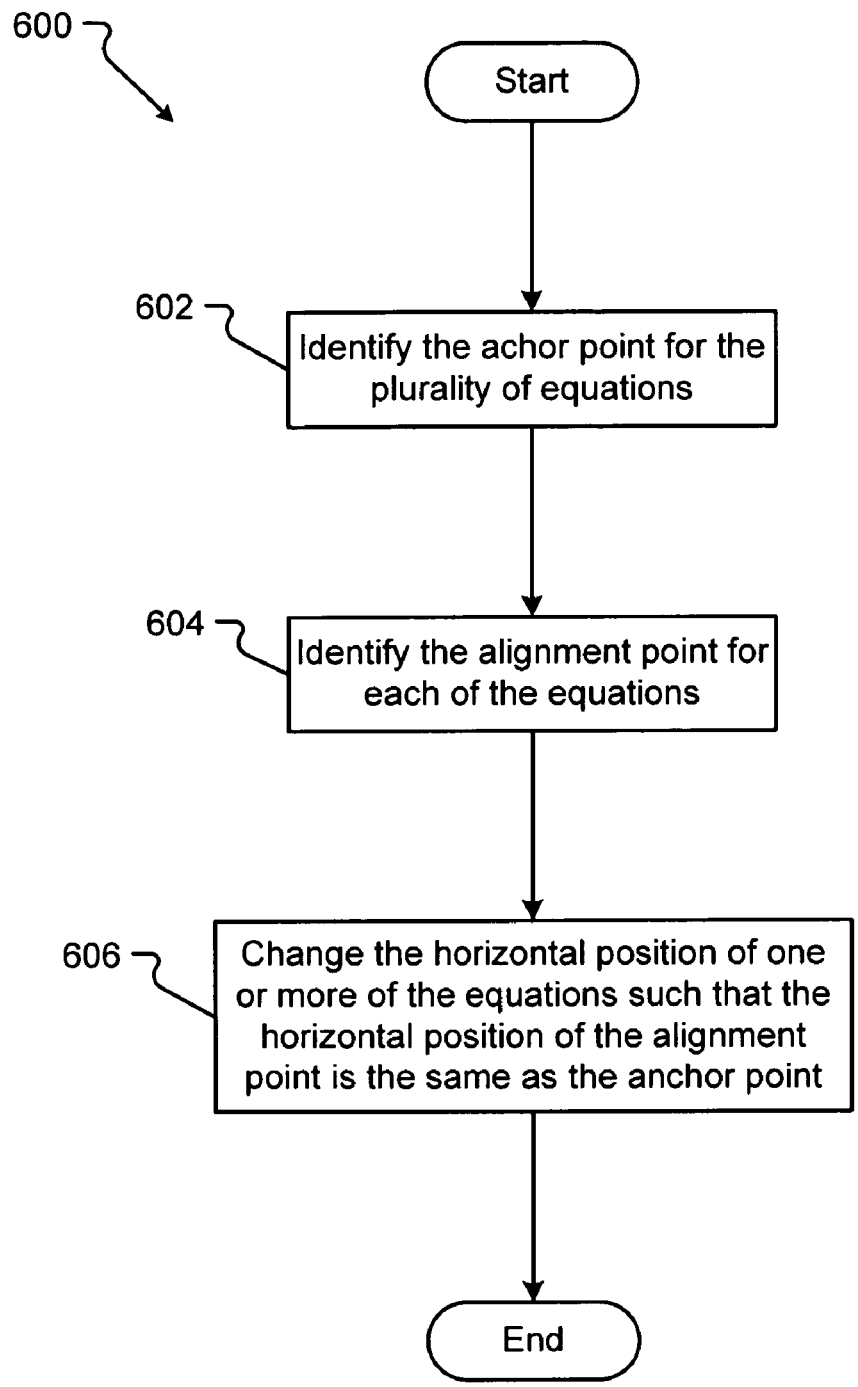
FIG. 6 shows an embodiment of a method for formatting a plurality of expressions according to the present disclosure.

An exemplary method 600 for aligning expressions in a document is shown in FIG. 6. Identify operation 602 identifies the anchor point for the plurality of expressions. In embodiments, the anchor point is an element in an expression. The anchor point may also be a horizontal position in the document. In embodiments, the user identifies the anchor point.

Identify operation 604 identifies the alignment point for each of the expressions. In one embodiment, a user provides a designation of the alignment point, such as input 312 (FIG. 3). In another embodiment, the alignment point is automatically identified or determined. For example, an alignment point selection module, such as alignment point selection module 310 (FIG. 3), scans and compares each expression to find one or more elements that each expression has in common and selects the common element as the alignment point. The module may, when more than one element is common to all expressions, select one of the common elements as an alignment point.

Change operation 606 changes the horizontal position of one or more expressions such that the alignment point of each expression has the same horizontal position as the anchor point. An exemplary embodiment of change operation 606 is described below with reference to FIG. 7. In one embodiment, change operation 606 determines a distance and direction for an indention for each expression. Then, change operation 606 moves or indents each expression by the determined indention.

Figure 7:
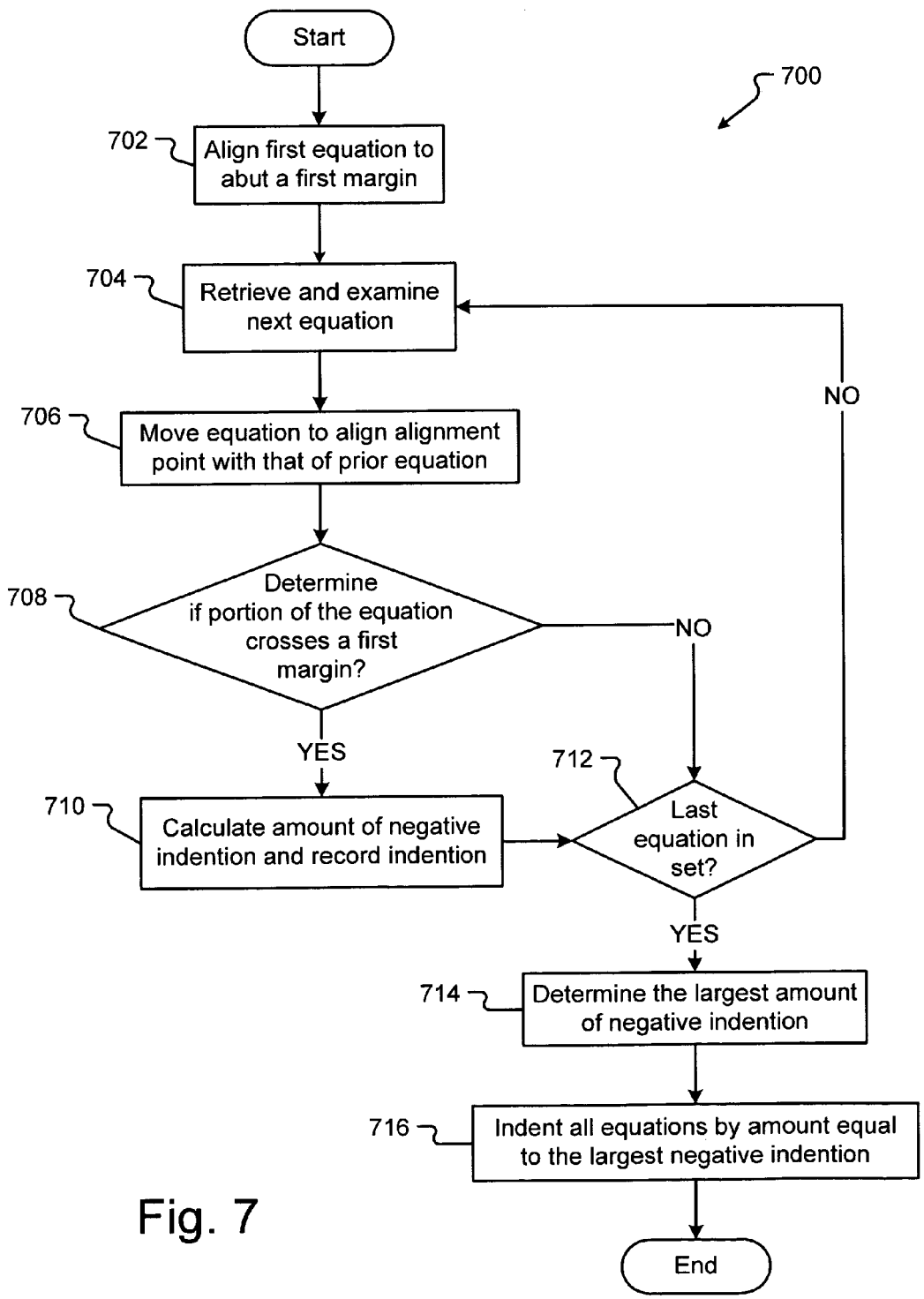
FIG. 7 shows an embodiment of a method for moving expressions to create an alignment according to the present disclosure.

An exemplary embodiment of a method 700 for changing the alignment of a plurality of expressions is shown in FIG. 7. First, align operation 702 aligns the first expression with a first margin such that the first expression abuts the first margin. Retrieve operation 704 retrieves the next expression. In embodiments, the method 700 assumes that each expression can cross any margin and has an unlimited length. Move operation 706 moves the retrieved expression such that the anchor point of the first expression and the alignment point of the retrieved expression have the same horizontal position. In embodiments, the move operation 706 determines a direction and distance for an indention for the retrieved expression. Upon determining the indention, the expression is moved the direction and distance of the indention. In embodiments, after the expression is moved, the method 700 no longer assumes that the expression can cross the margins or has an unlimited length.

Determine operation 708 determines if a portion of the retrieved expression crosses a first margin, e.g., the left margin. If a portion of the retrieved expression has not crossed the first margin, the flow branches NO to determine operation 712. However, if a portion of the retrieved expression has crossed a first margin, the flow branches YES to calculate operation 710. Calculate operation 710 calculates an amount of negative indention for the retrieved expression. The amount of negative indention is recorded, such as in a memory array.

Determine operation 712 determines if the expression is the last expression in the present set of expressions. If the retrieved expression is not the last expression in the set of expressions, the flow branches NO back to retrieve operation 704. If the retrieved expression was the last expression in the set of expressions, the flow branches YES to determine operation 714. Determine operation 714 determines the largest negative indention recorded by calculate operation 710. Upon identifying the largest negative indention, indention operation 716 indents all expressions in the set of expressions by a positive indention equal to the largest negative indention. As such, all expressions are aligned and no expression crosses the first margin.

Figure 8:
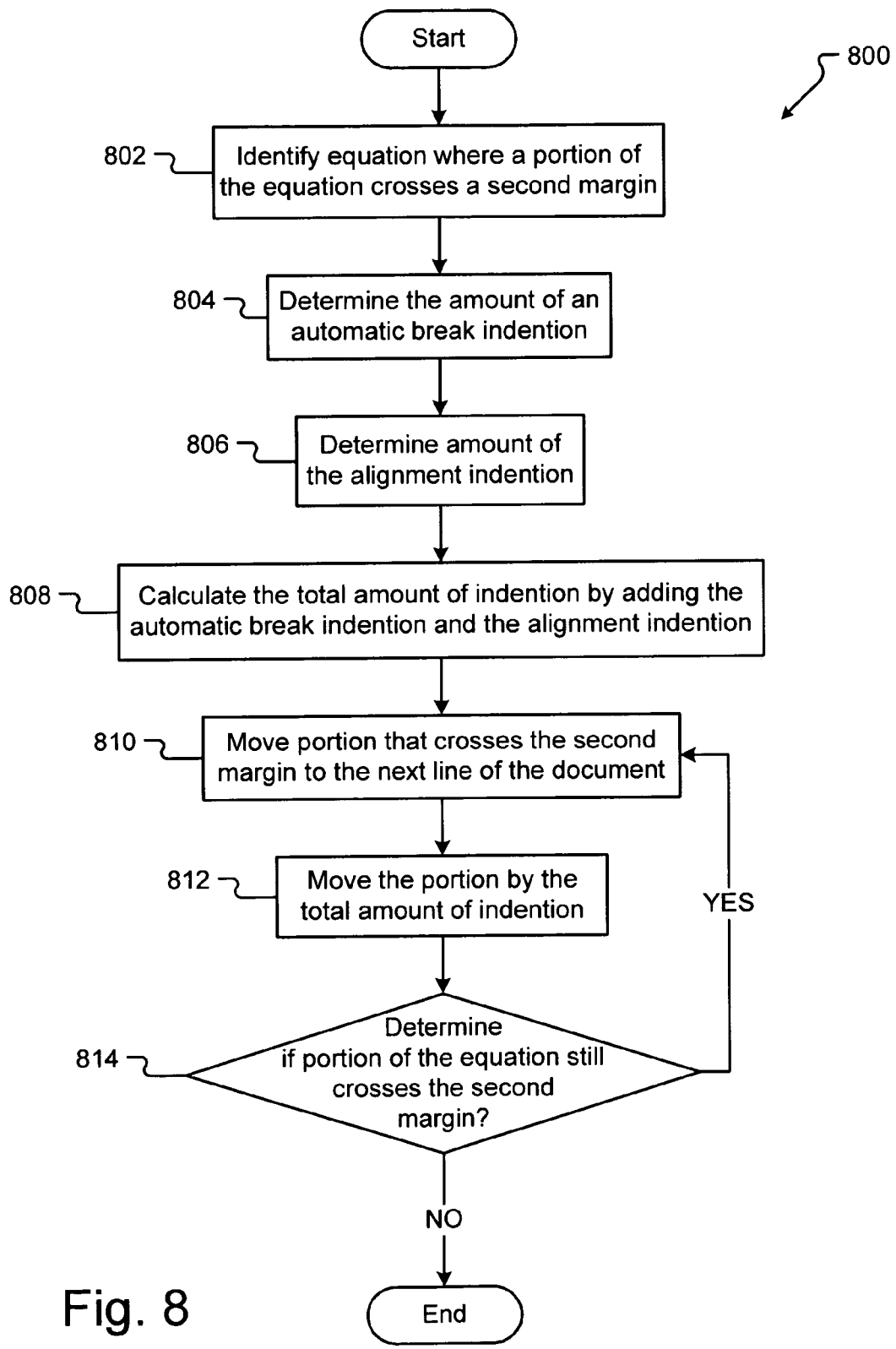
FIG. 8 shows an embodiment of a method for creating a break in an aligned expression according to the present disclosure.

An exemplary embodiment of a method 800 for forcing an automatic break in an aligned expression is shown in FIG. 8. In embodiments, identify operation 802 identifies an expression where a portion of the expression crosses a second margin, e.g., the right margin, as is shown in and described in conjunction with FIG. 5A. Determine operation 804 determines the amount of automatic break indention. The automatic break indention is the distance between the first element in the expression and the first element after the alignment point. In embodiments, determine operation 806 also determines the amount of alignment indention. The alignment indention is the distance from the first margin, e.g., the left margin, and the first element in the expression. The alignment indention includes any positive and negative indention applied to the expression during the alignment process. Calculate operation 808 calculates the total indention for any portion that crosses the second margin by combining the break indention and the alignment indention.

Move operation 810 moves the portion of the expression that crosses the second margin to the next line of the document. In embodiments, move operation 810 moves any expression or other element already occupying the next line before moving the portion of the expression. Thus, only the moved portion of the expression occupies the next line after the move. Move operation 812 then moves the portion of the expression on the next line by the total indention. In this way, the broken portion of the expression is correctly positioned in the expression to maintain the meaning of the expression.

Determine operation 814 determines if any other portion of the expression still crosses the second margin. In other words, determine operation 814 evaluates very long expressions to determine, if after an automatic break, the expression is still long enough to cross the second margin. If the expression is long enough to cross the second margin again, the flow branches YES to move operation 810. If the expression does not still cross the second margin, the flow branches NO to termination.

In further aspects of the invention, a system for aligning mathematical expressions in a document comprises a mathematical expression assembly module that accepts mathematical expression inputs and forms a plurality of mathematical expressions from the inputs; an alignment point selection module that identifies an alignment point for the plurality of mathematical expressions and an anchor point for at least one mathematical expressions; a movement determination module that calculates an amount of indention for one or more mathematical expressions; and a mathematical expression movement module that changes the horizontal position of one or more mathematical expressions by the amount of indention such that the alignment point of each mathematical expression has the same horizontal position, determines if one or more expressions crosses a second margin, and inserts a break in any mathematical expression that crosses a second margin. Further, the movement determination module may repeat the above steps for one or more other mathematical expressions, determine the largest amount of negative indention from the recorded negative indentions, and move all mathematical expressions by an additional positive indention, equal to the largest negative indention. In further embodiments, the alignment point selection module receives an alignment point designation from a user. In addition, the movement determination module can determine a position for the alignment point of a first mathematical expression and determine an amount of indention for another mathematical expression. The movement determination module, in other embodiments, determines if a portion of a mathematical expression crosses a first margin, calculates an amount of negative indention to prevent the portion from crossing the first margin, and records the negative indention.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present disclosure. Therefore, the specific structure, acts, or media are disclosed as exemplary embodiments. The invention is defined by the appended claims.

What is claimed is:

1. A computer storage medium encoding a computer program of instructions for executing a computer implemented method for formatting a plurality of mathematical expressions that occupy one or more lines in a document, the method comprising:

initializing and utilizing an expression editing tool to format the plurality of mathematical expressions, the expression editing tool:

identifying an anchor point for a first mathematical expression;

identifying an alignment point for each line of each mathematical expression;

changing with the expression editing tool the horizontal position of a second mathematical expression such that the alignment point of the second mathematical expression and the anchor point for the first mathematical expression have the same horizontal position;

after the changing the horizontal position, determining if a portion of the second mathematical expression crosses a second margin of the document;

if a portion of the second mathematical expression crosses the second margin on a first line of the document, forcing an automatic break for the portion of the second mathematical expression crossing the second margin and calculating a total indention to maintain a meaning of the second mathematical expression:
  determining the amount of an automatic break indention for the portion of the second mathematical expression crossing the second margin, wherein the automatic break indention is the distance on a next line to align a first element of the portion of the second mathematical expression crossing the second margin with a first element on the first line after the alignment point of the second mathematical expression,
  determining the amount of the changing of the horizontal position, and
  adding with the expression editing tool the amount of the automatic break indention and the amount of the changing of the horizontal position to calculate the total indention;
 moving with the expression editing tool the portion of the second mathematical expression that crosses the second margin to the next line of the document; and
 applying with the expression editing tool the total indention to the moved portion.

2. A computer storage medium as defined in claim 1, the expression editing tool inserting one or more manual breaks into one or more of the plurality of mathematical expressions.

3. A computer storage medium as defined in claim 1, wherein the anchor point of the first mathematical expression is automatically selected by scanning and comparing each mathematical expression in the plurality of mathematical expressions to find one or more elements common to all mathematical expressions.

4. A computer storage medium as defined in claim 1, wherein the anchor point of the first mathematical expression is located relative to at least one margin.

5. A computer storage medium as defined in claim 4, wherein the anchor point is one or more from the group consisting of: left aligned relative to a first margin, right aligned relative to the second margin, and center aligned between the first margin and the second margin.

6. A computer storage medium as defined in claim 1, wherein a user interface allows a user to select the anchor point for the first mathematical expression.

7. A computer storage medium as defined in claim 6, wherein the selected anchor point is provided to the expression editing tool.

8. In a computer system, a method for formatting a plurality of mathematical expressions that occupy one or more lines in a document, comprising:
  aligning the plurality of mathematical expressions, comprising:
   initializing and utilizing an expression editing tool to format the plurality of mathematical expressions, the expression editing tool:
    identifying an anchor point for a first mathematical expression;
    identifying an alignment point for each line of each mathematical expression;
    determining a horizontal indent for a first line of a second mathematical expression such that the alignment point of the second mathematical expression and the anchor point of the first mathematical expression have the same horizontal position;
    inserting the horizontal indent into the first line with the expression editing tool;
   wherein, during alignment, each line has limitless horizontal space;
  after the alignment, determining if a portion of the second mathematical expression on the first line crosses a second margin of the document;
  if the portion of the second mathematical expression crosses the second margin on the first line, forcing an automatic break for the portion of the second mathematical expression crossing the second margin and calculating a total indention to maintain a meaning of the second mathematical expression:
   determining the amount of an automatic break indention for the portion of the second mathematical expression crossing the second margin, wherein the automatic break indention is the distance on a next line to align a first element of the portion of the second mathematical expression crossing the second margin with a first element on the first line after the alignment point of the second mathematical expression,
   determining the amount of the alignment indention, and
   adding with the expression editing tool the amount of the automatic break indention and the alignment indention to calculate the total indention;
  moving with the expression editing tool the portion of the second mathematical expression that crosses the second margin to the next line of the document; and
  applying with the expression editing tool the total indention to the moved portion.

9. A method as defined in claim 8, wherein determining the horizontal indent for the first line comprises:
  determining a largest negative indent; and
  applying an additional positive indent, equal in length to the largest negative indent, to the first line.

10. A method as defined in claim 8, wherein, during aligning, a manual break is inserted into one or more of the plurality of mathematical expressions such that the one or more mathematical expressions occupies one or more lines.

11. A method as defined in claim 8, wherein the anchor point for the first mathematical expression is located relative to at least one margin.

12. A method as defined in claim 11, wherein the anchor point is one or more from the group consisting of: left aligned relative to a first margin, right aligned relative to the second margin, and center aligned between the first margin and the second margin.

13. A method as defined in claim 8, wherein a user interface allows a user to select the anchor point for the first mathematical expression.

14. A method as defined in claim 13, wherein the selected anchor point is provided to the expression editing tool.

15. A method as defined in claim 8, wherein the anchor point of the first mathematical expression is automatically selected by scanning and comparing each mathematical expression in the plurality of mathematical expressions to find one or more elements common to all mathematical expressions.

16. In a computer system having a graphical user interface including a display and a user interface selection device, a method of maintaining a manual break in an aligned document, comprising:
  initializing and utilizing an expression editing tool to format expressions, the expression editing tool:
   receiving a selection of an anchor point for a first mathematical expression, wherein the first mathematical expression is formed from a plurality of elements, and wherein the anchor point is selected using a user interface control to input a first selected element as the anchor point;

receiving the manual break in a second mathematical expression to create a first portion and a broken portion, selecting the manual break with the expression editing tool;

placing with the expression editing tool the broken portion on a next line of the document relative to the first portion of the document;

determining if an alignment point is received for the second mathematical expression;

aligning with the expression editing tool the second mathematical expression with the first mathematical expression using the alignment point and the anchor point such that the first portion of the second mathematical expression changes position; and moving with the expression editing tool the broken portion to maintain the position of the broken portion relative to the first portion.

17. A method as defined in claim 16, wherein moving the broken portion comprises:

determining an amount of a break indention from the alignment point to a first element in the broken portion;

determining an amount of an alignment indention applied during the alignment of the second mathematical expression;

combining the break indention and the alignment indention to generate a total indention; and applying the total indention to the broken portion.

18. A method as defined in claim 16, further comprising:

determining if the first portion or the broken portion crosses a second margin; and if the first portion or the broken portion crosses the second margin, inserting an automatic break into the first portion or the broken portion to move a third portion to a new line.

19. A method as defined in claim 18, wherein moving the third portion comprises:

determining an amount of a break indention from the alignment point to a first element in the third portion;

determining an amount of an alignment indention applied during the alignment of the second mathematical expression;

combining the break indention and the alignment indention to generate a total indention; and applying the total indention to the third portion.

* * * * *